United States Patent
Echtler

(10) Patent No.: US 11,015,658 B2
(45) Date of Patent: May 25, 2021

(54) DRIVETRAIN OF AN ELECTRICALLY DRIVEN VEHICLE AND ELECTRICALLY DRIVEN VEHICLE

(71) Applicant: HOERBIGER ANTRIEBSTECHNIK HOLDING GMBH, Schongau (DE)

(72) Inventor: Peter Echtler, Schongau (DE)

(73) Assignee: HOERBIGER ANTRIEBSTECHNIK HOLDING GMBH, Schongau (DE)

(*) Notice: Subject to any disclaimer, the term of this patent is extended or adjusted under 35 U.S.C. 154(b) by 27 days.

(21) Appl. No.: 16/532,973

(22) Filed: Aug. 6, 2019

(65) Prior Publication Data
US 2020/0049205 A1     Feb. 13, 2020

(30) Foreign Application Priority Data
Aug. 7, 2018  (DE) .................... 10 2018 119 199.5

(51) Int. Cl.
| F16D 13/36 | (2006.01) |
| F16D 13/16 | (2006.01) |
| B60W 10/02 | (2006.01) |
| F16D 69/00 | (2006.01) |

(52) U.S. Cl.
CPC ............ F16D 13/16 (2013.01); B60W 10/02 (2013.01); *F16D 2069/009* (2013.01)

(58) Field of Classification Search
CPC .......... F16D 13/24–36; F16D 25/0632; F16D 27/11; F16D 7/028
See application file for complete search history.

(56) References Cited

U.S. PATENT DOCUMENTS

| 2,059,935 A | * | 11/1936 | Eason ..................... F16D 13/64 |
| | | | 192/66.22 |
| 3,160,030 A | * | 12/1964 | Wickman ............ F16H 63/3026 |
| | | | 475/142 |
| 4,318,463 A | * | 3/1982 | Varis ...................... F16D 13/26 |
| | | | 192/85.21 |
| 2016/0084321 A1 | * | 3/2016 | Mihajlovic ......... F04C 15/0061 |
| | | | 417/222.1 |
| 2017/0326962 A1 | * | 11/2017 | Aringsmann ........... F16D 13/24 |

FOREIGN PATENT DOCUMENTS

| DE | 102009054743 A1 | * | 6/2011 | ......... F16D 25/0632 |
| EP | 2602504 A1 | * | 6/2013 | ............... F16H 1/46 |
| GB | 170692 A | * | 11/1921 | ............. F16D 7/028 |

* cited by examiner

*Primary Examiner* — David R Morris
(74) *Attorney, Agent, or Firm* — McNees Wallace & Nurick LLC

(57) ABSTRACT

Electrically driven vehicle including a drivetrain with an electric motor which forms the drive of the vehicle, and a frictionally engaging clutch. The clutch is a normally closed clutch with conical friction elements, which rest against each other in pairs in a closed position and transmit torque.

9 Claims, 2 Drawing Sheets

DRIVETRAIN OF AN ELECTRICALLY DRIVEN VEHICLE AND ELECTRICALLY DRIVEN VEHICLE

FIELD OF THE INVENTION

The invention relates to a drivetrain of an electrically driven vehicle with a frictionally engaging clutch, and an electrically driven vehicle with such a drivetrain.

BACKGROUND OF THE INVENTION

Electrically driven vehicles are known from the state of the art. They have an electric prime mover or an electric motor, which is equipped for the locomotion of the vehicle, and usually a traction battery, which provides the energy for the drive.

Furthermore, drivetrains for such vehicles are known from the state of the art.

Because of the limited capacity of the traction battery available in the vehicle due to costs and installation space, the system efficiency is of paramount importance in electromobility in order to be able to provide a large range for electrically driven vehicles. Here the drivetrains of these vehicles are even more important than in the case of vehicles with internal combustion engines and conventional drivetrains.

In order to utilize the available capacity as efficiently as possible, drivetrains with multispeed gearboxes are used. Due to the multispeed gearbox the electric motor can be operated at an operating point that is as efficient as possible. A disadvantageous effect is the necessary energy that is required for the shifting and frictionally engaged holding in gear.

The object of the invention is therefore to provide an optimized drivetrain for electrically driven vehicles which is particularly energy-efficient. The object of the invention is furthermore to provide an electrically driven vehicle which has a large range.

SUMMARY OF THE INVENTION

The invention provides a drivetrain of an electrically driven vehicle is provided, which has at least one clutch. Here the clutch is a normally closed clutch with several conical friction elements, which rest against each other in pairs in a closed position and transmit torque. Normally closed clutches are clutches which are closed in the basic state and must be actuated to open. In order to hold the clutch in the closed state only a small force, in particular none, has to be applied, which means that the drivetrain is particularly energy-efficient. The conical friction elements form a mechanical load amplification, through which the number and size of the friction surfaces can be reduced. For example, in this way the gross friction surface can be reduced by over 80% compared with a comparable clutch without conical friction elements. Correspondingly, not only the drag torques of the clutch, but also the closing force or holding force, which are required to actuate the clutch, are reduced. For example, the actuating forces can be reduced by 60% compared with a comparable clutch without conical friction elements. The drivetrain is particularly suitable for electrically driven vehicles, as they usually have only a small number of drive gears. Because of this, shifting between the gears is only carried out relatively infrequently during driving, with the result that the closed period of a clutch is relatively long and predictable. Thus the use of a normally closed clutch leads to a particularly energy-efficient drivetrain, which can increase the range of the electrically driven vehicle.

The clutch preferably comprises at least one spring element, which holds the clutch in the normally closed position. As the closed state of the clutch is achieved by the spring element, the holding forces can be kept low and constant through this mechanical load amplification. In particular, external energy may not be necessary for the closed state, i.e. energy need not be expended in order to hold the clutch closed. Thus there is more energy available for the locomotion, with the result that the range of the vehicle is increased.

The frictional torque is defined by the following formula:

$$M_R = \frac{F_S \cdot \mu \cdot d_m \cdot i}{2 \cdot \sin\alpha}$$

with
- $M_R$: frictional torque
- $F_S$: shifting force
- $\mu$: friction coefficient
- $d_m$: average friction diameter
- $i$: number of friction surfaces
- $\alpha$: cone angle.

The transmission ratio of the mechanical load amplifier can thus be varied via the cone angle of the friction elements.

It is therefore advantageous if the cone angle of the friction elements is less than 30° and preferably lies in the range of from 3° to 15°, in order to keep the necessary holding forces particularly low.

It can be provided that at least one, in particular all, of the conical friction elements have an organic friction lining, which has a particularly high friction coefficient.

Additionally or alternatively, it can be provided that at least one, in particular all, of the conical friction elements have a metallic friction lining, which is particularly robust.

According to an embodiment, the clutch is a wet clutch, which is particularly low-wear and can be correspondingly cooled by oil.

According to a further embodiment, the drivetrain comprises a gearbox, in which the clutch is mechanically integrated in order to switch between different operating states.

The gearbox can be a multispeed gearbox, wherein the clutch is provided for the actuation of at least one drive gear. A multispeed gearbox has the advantage that different drive gears can be provided, which are matched to different requirements of particular driving situations. In this way the driving dynamics as well as the ride comfort can be increased.

In an embodiment, the gearbox has a main drive gear and at least one secondary drive gear, wherein the normally closed clutch is provided for the actuation of the main drive gear and at least one normally open clutch is provided for the actuation of the at least one secondary drive gear. Normally open clutches are clutches which are open in the basic state and must be actuated to close. The main drive gear is the gear which is engaged most of the time in normal or usual driving mode, preferably more than 50%, in particular more than 80% of the working time. This can vary depending on the driving profile of the corresponding vehicle class. In the case of a city car, for example, it is the gear which is provided for a driving speed in the lower speed range, such as between 0 and 60 km/h. In the case of a vehicle with a driving profile with a dominant proportion of interurban and/or motorway driving, the main drive gear would be, for example, the gear which is provided for a driving speed in the upper speed range, such as above 60 km/h. As the normally closed clutch of the main drive gear is engaged in the closed position, the vehicle can be driven very energy-efficiently in this operating mode. Because this operating mode is predominantly used to drive the vehicle, a particularly large increase in the range of the vehicle can be obtained in this way.

In an alternative embodiment, the gearbox is a single-speed gearbox, wherein a drive gear is held in the engaged position by means of the clutch in the normally closed position. This drivetrain has the advantage that it can be constructed in a very simple and compact manner, which means that it can be produced cost-effectively and with a small mass.

Here the normally closed clutch can be provided as a safety clutch to protect against damage to the drivetrain.

Additionally or alternatively, the electric motor can be decoupled in order to avoid the drag torques of a PSM (permanent magnet synchronous machine) while in sailing mode.

According to the invention, an electrically driven vehicle with a drivetrain according to the invention is also provided to achieve the above-named object. Because of the very energy-efficient drivetrain such a vehicle has a large range.

The object is furthermore achieved by an electrically driven vehicle with a drivetrain according to the invention, wherein the vehicle comprises an electrical control system and an electric motor. The electric motor and the gearbox are designed such that the main drive gear is provided for a driving speed up to 90 km/h, preferably up to 100 km/h, in particular up to 110 km/h and the gearbox is shifted into a secondary drive gear at a higher driving speed. As a result of this the particularly energy-efficient operating mode in which the main drive gear is engaged comprises both city and interurban journeys on roads, which usually make up the majority of use of the vehicle. In this way a particularly large range can be achieved.

DETAILED DESCRIPTION OF THE INVENTION

Figure 1:
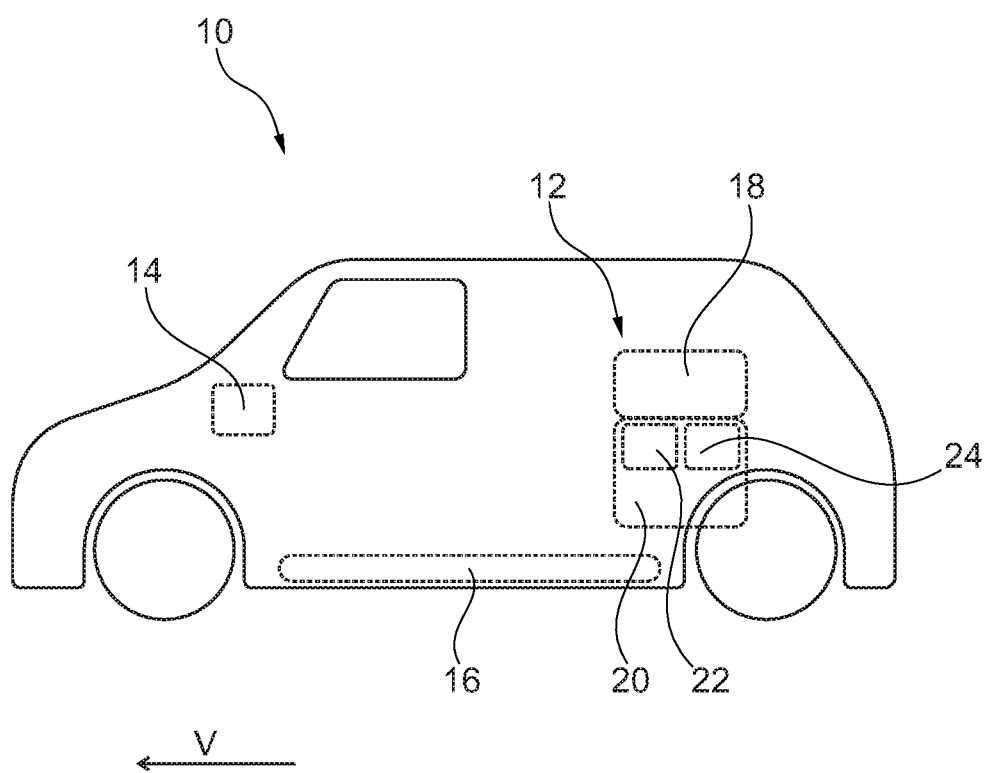
FIG. 1 shows a schematic representation of an electrically driven vehicle according to the invention with a drivetrain according to the invention which comprises a gearbox with a normally closed clutch.

FIG. 1 shows an electrically driven vehicle 10 with a drivetrain 12, an electrical control system 14 and a traction battery 16, which provides electrical energy to drive the vehicle 10.

The drivetrain 12 comprises an electric motor 18, which forms the drive of the vehicle 10, and a gearbox 20, which is coupled to the electric motor 18.

The gearbox 20 is a two-speed gearbox with a normally closed clutch 22, which is provided for the main drive gear, and a normally open clutch 24, which is provided for the secondary drive gear.

Of course the gearbox 20 can also have only one or more than two gears. In all embodiments, the main drive gear, which represents the only gear in the case of a single-speed gearbox, is provided by the normally closed clutch 22. In the case of multispeed gearboxes, all further gears are realized via corresponding normally open clutches 24 and form the respective secondary drive gears.

In all cases a reverse driving mode, which is conventionally also referred to as reverse gear, can be provided by reversing the direction of rotation of the electric motor 18, with the result that no separate clutch is required for this purpose.

Such a reverse driving mode is provided in addition to the main drive gear and any secondary drive gears. This means that "single-speed" or "multispeed" refers in particular only to the drive gears which are equipped to drive the vehicle 10 in the forward direction V.

Figure 2:
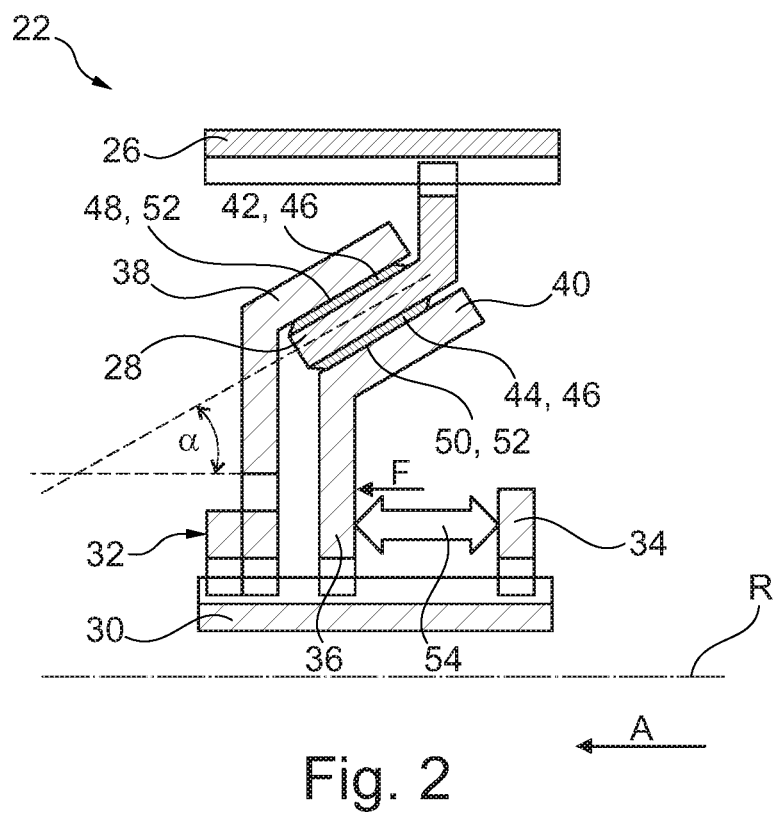
FIG. 2 shows a schematic sectional view of the normally closed clutch from FIG. 1 in the closed position.
Figure 3:
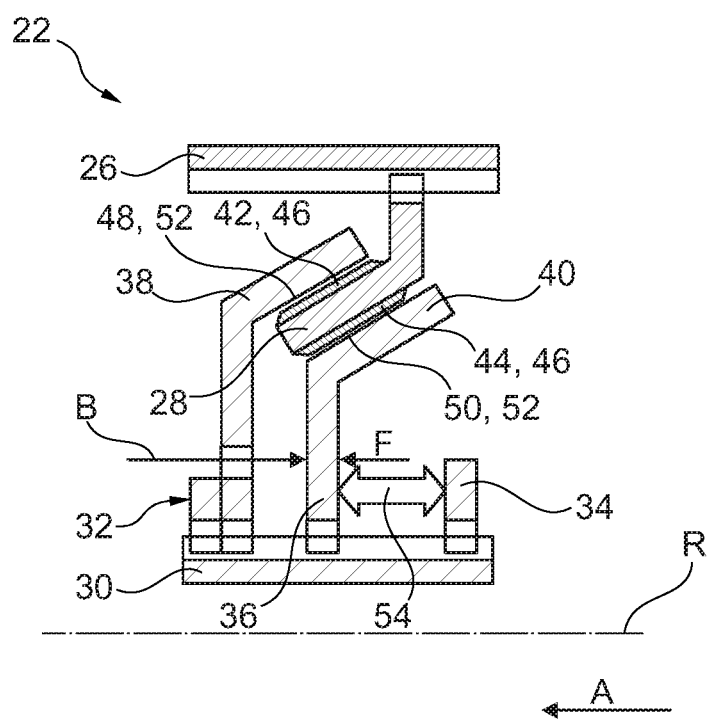
FIG. 3 shows a schematic sectional view of the normally closed clutch from FIG. 1 in the open position.

With reference to FIGS. 2 and 3, the structure and the functioning of the normally closed clutch 22, which is provided for the torque-transmitting coupling of a first shaft to a second shaft (not represented) and is constructed concentrically with respect to the common rotational axis R, are described below.

Depending on the drive direction of the electric motor 18, the first shaft is a drive shaft and the second shaft is an output shaft, or vice versa.

The normally closed clutch 22 is a wet clutch and comprises an outer carrier 26 with a first conical friction element 28 and an inner carrier 30 with a countersupport 32, an axial stop 34 and a pressure element 36, which is mounted displaceably in the axial direction A.

In an alternative embodiment, the normally closed clutch 22 can be designed to be not wet.

The countersupport 32 has a second conical friction element 38 and the pressure element 36 has a third conical friction element 40.

The first conical friction element 28 on the inside is connected to the first shaft in a torque-transmitting manner via the outer carrier 26, and the second and third conical friction elements 38, 40 on the outside are connected to the second shaft in a torque-transmitting manner via the inner carrier 30.

Furthermore the first conical friction element 28 has a first conical friction surface 42 on the outside and a second conical friction surface 44 on the inside, arranged opposite, which are in each case formed by an organic friction lining 46.

Additionally or alternatively, the conical friction surfaces 42, 44 can be formed by a different material at least in sections, in particular by a metallic friction lining.

The second conical friction element 38 has an inner conical friction surface 48 and the third conical friction element 40 has an outer conical friction surface 50, which are in each case formed by a metallic friction lining 52.

Additionally or alternatively, the conical friction surfaces 48, 50 can be formed by a different material at least in sections, in particular by an organic friction lining.

The conical friction elements 28, 38, 40 as well as the conical friction surfaces 42, 44, 48, 50 have the same cone angle $\alpha$ (see FIG. 2) and are arranged concentrically with respect to each other, with the result that the conical friction surfaces 42, 44, 48, 50 are equidistant from each other at all points, in each case in pairs. This means that the intersection sections of the conical friction surfaces 42, 44, 48, 50 run parallel to each other in the case of an axial cross section, as represented in FIGS. 2 and 3.

Furthermore the first conical friction element 28 is arranged between the second conical friction element 38 and the third conical friction element 40, with the result that the inner conical friction surface 48 is arranged opposite the first conical friction surface 42 and the outer conical friction surface 50 is arranged opposite the second conical friction surface 44.

In principle, the clutch 22 can have any desired number of conical friction elements 28, 38, 40, the conical friction surfaces 42, 44, 48, 50 of which are arranged opposite each other in each case in pairs.

The cone angle α is less than 30°. Alternatively the cone angle α can have any desired value between 0° and 90°, but it preferably lies in a range of from 3° to 15°, as a particularly favourable mechanical load amplification is achieved in this range.

The normally closed clutch 22 furthermore has a spring element 54, which is arranged between the axial stop 34 and the pressure element 36 in the axial direction A and exerts a spring force on the pressure element 36 in the axial direction A.

The spring force F is so great that the pressure element 36 presses the conical friction elements 28, 38, 40 against each other in the axial direction A and the conical friction surfaces 42, 44, 48, 50 in each case opposite each other in pairs rest against each other in a torque-transmitting manner.

In this way the first shaft is coupled to the second shaft in a torque-transmitting manner and the normally closed clutch 22 is thus closed (see FIG. 2).

In order to move the normally closed clutch 22 into the open position (see FIG. 3), an actuating force B which is greater than the spring force F is exerted on the pressure element 36 contrary to the axial direction A.

The pressure element 36 is hereby pushed away from the countersupport 32 contrary to the axial direction A, with the result that the conical friction elements 28, 38, 40 are no longer pressed against each other and the conical friction surfaces 42, 44, 48, 50 opposite each other in each case in pairs no longer rest against each other in a torque-transmitting manner.

The first shaft is thus no longer coupled to the second shaft in a torque-transmitting manner and the normally closed clutch 22 is open.

The normally open clutch 24 is designed analogously to the normally closed clutch 22, wherein the normally open clutch 24 is held in the open position by a corresponding spring element and can be closed via a corresponding actuating force.

Of course, any desired normally open clutch 24 can alternatively be provided, in particular without conical friction elements.

The drivetrain 12 is designed here such that the vehicle 10 drives up to a driving speed of 100 km/h in the main drive gear, i.e. with a closed normally closed clutch 22 and an open normally open clutch 24, and the control system 14 engages the secondary drive gear at a higher driving speed, in which case the normally open clutch 24 is closed and the normally closed clutch 22 is open.

In an alternative embodiment, the main drive gear can be provided for other driving speeds, for example for a driving speed up to 90 km/h or up to 110 km/h.

As the spring force F is large enough to hold the normally closed clutch 22 in the closed position, no external force has to be applied for the main drive gear, with the result that the latter is particularly energy-efficient.

Furthermore, the conical friction elements 28, 38, 40 bring about a mechanical load amplification, with the result that only a relatively small force is required for the shifting. The spring force F and thus the actuating force B can hereby be kept low, as a result of which the energy efficiency is further improved.

Because the closed state is produced via the spring element 54 in the case of the normally closed clutch 22, the pretensioning of this spring element 54 at the same time defines the maximum torque that can be transmitted. In this way the normally closed clutch 22 is designed as a safety clutch, which can protect the normally closed clutch 22 against loads that are too high and thus against damage.

In addition, a sailing function can be provided, in which the control system 14 opens the clutches 22, 24 in driving situations in which no drive is necessary, with the result that the electric motor 18 is decoupled. The decoupling prevents the vehicle 10 from being braked unnecessarily by the drag torques of the electric motor 18.

In this way the drivetrain 12 is very energy-efficient and the electrically driven vehicle 10 has a particularly large range.

The invention is not limited to the embodiments shown. In particular, individual features of one embodiment can be contained in a further embodiment according to the invention, not shown, independently of the other features of the corresponding embodiment, i.e. the described features can be combined as desired.

What is claimed is:

1. Electrically driven vehicle comprising a drivetrain with an electric motor which forms the drive of the vehicle, and a frictionally engaging clutch, wherein the clutch is a normally closed clutch with conical friction elements, which rest against each other in pairs in a closed position and transmit torque, wherein the vehicle comprises a single-speed gearbox, in which the clutch is mechanically integrated.

2. Electrically driven vehicle according to claim 1, wherein the clutch comprises at least one spring element, which holds the clutch in the normally closed position.

3. Electrically driven vehicle according to claim 1, wherein the cone angle of the friction elements is less than 30°.

4. Electrically driven vehicle according to claim 1, wherein the cone angle of the friction elements lies in the range of from 3° to 15°.

5. Electrically driven vehicle according to claim 1, wherein at least one of the conical friction elements have an organic or metallic friction lining.

6. Electrically driven vehicle according to claim 1, wherein all of the conical friction elements have an organic or metallic friction lining.

7. Electrically driven vehicle according to claim 1, wherein the clutch is a wet clutch.

8. Electrically driven vehicle comprising a drivetrain with a frictionally engaging clutch, wherein the clutch is a normally closed clutch with conical friction elements, which rest against each other in pairs in a closed position and transmit torque, wherein the vehicle comprises an electrical control system, a gearbox and an electric motor, wherein the electric motor and the gearbox are designed such that a main drive gear is provided for a driving speed up to 90 km/h.

9. Electrically driven vehicle comprising a drivetrain with a frictionally engaging clutch, wherein the clutch is a normally closed clutch with conical friction elements, which rest against each other in pairs in a closed position and transmit torque, wherein the vehicle comprises an electrical control system, a gearbox and an electric motor, wherein the electric motor and the gearbox are designed such that a main drive gear is provided for a driving speed up to 100 km/h, and beyond this the gearbox is shifted into a secondary drive gear.

* * * * *